United States Patent
Mehd et al.

(10) Patent No.: US 11,544,704 B2
(45) Date of Patent: Jan. 3, 2023

(54) SYSTEMS AND METHODS FOR TRACKING STORED ACCOUNTS

(71) Applicant: Visa International Service Association, San Francisco, CA (US)

(72) Inventors: Jaysheel Malaybhai Mehd, Singapore (SG); Shankara Narayanan Ramesh, Singapore (SG); Avishek Prasad, Singapore (SG); Rohit Mukherjee, Singapore (SG); Azad Singh, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 97 days.

(21) Appl. No.: 16/656,176

(22) Filed: Oct. 17, 2019

(65) Prior Publication Data
US 2021/0117964 A1    Apr. 22, 2021

(51) Int. Cl.
*G06Q 20/38*    (2012.01)
*G06Q 20/36*    (2012.01)

(52) U.S. Cl.
CPC ......... *G06Q 20/382* (2013.01); *G06Q 20/367* (2013.01)

(58) Field of Classification Search
None
See application file for complete search history.

(56) References Cited

U.S. PATENT DOCUMENTS

| | | | |
|---|---|---|---|
| 9,195,984 B1* | 11/2015 | Spector | G06Q 20/367 |
| 2009/0144204 A1* | 6/2009 | Hurry | G06Q 20/4014 705/71 |
| 2009/0281871 A1* | 11/2009 | Tietzen | G06Q 30/0236 705/14.3 |
| 2010/0280896 A1* | 11/2010 | Postrel | G06Q 30/0228 705/14.29 |
| 2011/0251882 A1* | 10/2011 | Richard | G06Q 30/0233 705/14.1 |
| 2012/0158532 A1* | 6/2012 | Fitzsimmons | G06Q 30/0601 705/26.1 |
| 2013/0066771 A1* | 3/2013 | Ciurea | G06Q 30/0241 705/39 |
| 2015/0220914 A1* | 8/2015 | Purves | G06Q 30/0633 705/41 |
| 2019/0197529 A1* | 6/2019 | Nelms | G06Q 20/367 |
| 2020/0051112 A1* | 2/2020 | Nelsen | G06Q 40/06 |

* cited by examiner

*Primary Examiner* — Chrystina E Zelaskiewicz
(74) *Attorney, Agent, or Firm* — Loeb & Loeb LLP (57) ABSTRACT

A computer-implemented method includes receiving an indicator that a consumer stored account details associated with an account with a resource provider computer of a resource provider in an add-account event. The transaction details associated with the add-account event are displayed to the consumer at a display interface of a computer device if the consumer is enrolled in an account-on-file tracking system configured to track add-account events for the account. The method may further include providing the consumer with one or more transaction control selections at the display interface that allow the consumer to place transaction controls on the account stored with the resource provider computer.

5 Claims, 9 Drawing Sheets

SYSTEMS AND METHODS FOR TRACKING STORED ACCOUNTS

TECHNICAL FIELD

Embodiments discussed herein generally relate to systems and methods for tracking accounts that a consumer has stored with various resource providers, and for applying controls on the accounts stored with the various resource providers.

BACKGROUND

The amount of commercial transactions that consumers conduct electronically over the internet is increasing rapidly. Many merchants host e-commerce websites or applications that allow consumers to purchase goods and services, set up subscriptions, or set up recurring transactions from a computer device. Additionally, consumer use of mobile wallet applications provided by mobile wallet providers is on the rise as well. Mobile payment applications allow consumers to establish a mobile wallet on a mobile device, and make payments with the mobile device in place of a physical payment card (e.g., a credit card, a debit card, etc.). A consumer may select a desired account (e.g., a credit card account, a debit card account, etc.) from their mobile wallet for making a purchase, and tap his or her mobile device at a merchant terminal when checking out.

Although e-commerce websites/applications and mobile wallet applications offer consumers with a number of conveniences, many require consumers to store details associated with one or more accounts when registering for the service. A consumer may struggle to keep track of which account details are stored with which merchants and/or mobile wallet providers, particularly if the consumer has multiple accounts stored with several different merchants and/or mobile wallet providers. Furthermore, consumers may struggle to regulate their spending with the accounts that are stored with the merchants and/or mobile wallet providers.

WO 2018/034912 A1 describes a computer-implemented system that looks for recurring transactions or other patterns between a consumer and resource provider computers associated with resource providing entities, and automatically updates the consumer's account information stored with the resource provider computers when the consumer's account information has changed.

However, there is still a need for systems that allow consumers to keep track of which merchants and/or mobile wallet providers are holding their account details on file. There is also a need for systems that allow consumers to control spending with their accounts held on file with different merchants and/or mobile wallet providers.

SUMMARY

Embodiments disclosed herein provide a technical solution to the above challenges by providing a platform that allows consumers to track accounts that are stored on file with merchants and/or mobile wallet providers. In one embodiment, a computer-implemented method includes receiving an indicator that a consumer stored account details of an account with a resource provider computer of a resource provider in an add-account event. The method further includes receiving transaction details associated with the add-account event, and determining whether the account is enrolled in an account-on-file tracking system. The account-on-file tracking system is at least configured to track add-account events for the account. The method further includes displaying the transaction details associated with the add-account event to the consumer at a display interface of a computer device if the account is enrolled in the account-on-file tracking system.

In another embodiment, a system for tracking one or more accounts of a consumer that are stored with one or more resource provider computers includes a processor physically configured according to computer executable instructions, a memory physically configured to store computer executable instructions and assist the processor, and an input output circuit in communication with the processor. The system further includes an add-account event detection module configured to detect an add-account event associated with an account of the consumer. The add-account event occurs when the consumer stores account details associated with the account with a resource provider computer of a resource provider. The system further includes an account-on-file determination module configured to determine whether the account is enrolled in an account-on-file tracking system. The account-on-file tracking system is configured to track add-account events for the account. Additionally, the system further includes a display module configured to display transaction details associated with the add-account event to the consumer at a display interface of a computer device if the consumer is enrolled in the account-on-file tracking system.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated.

Figure 1:
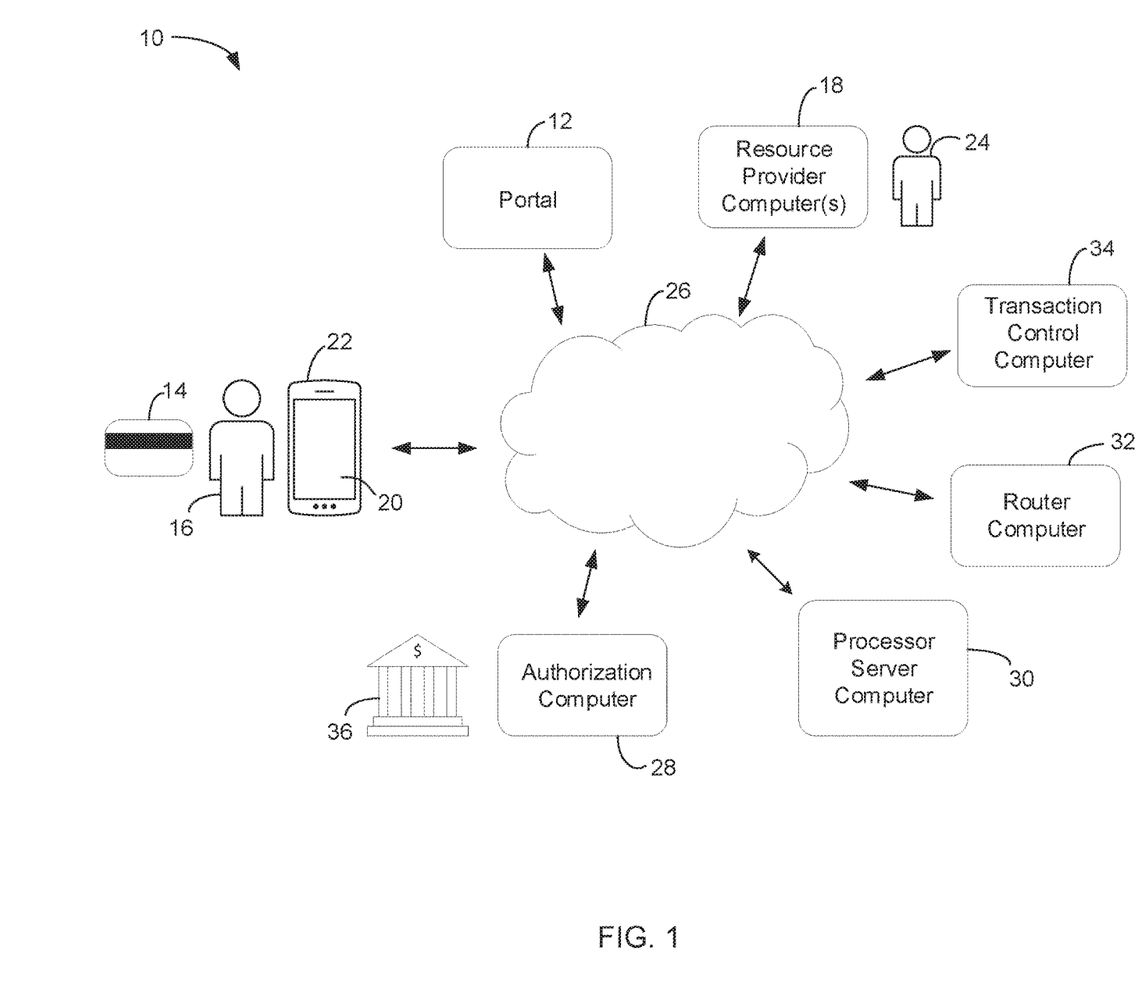
FIG. 1 is a schematic representation of an account-on-file tracking system, according to one embodiment.

Referring now to the drawings and with specific reference to FIG. 1, an account-on-file tracking system 10 is schematically depicted. The account-on-file tracking system 10 may include a portal 12 that tracks and stores "add-account events" associated with one or more accounts 14 of a consumer 16. An add-account event occurs when the consumer 16 stores details associated with an account 14 with a resource provider computer 18, such as when the consumer 16 registers his or her account 14 with an e-commerce website or application, or a mobile wallet application. The portal 12 may also be configured to display the add-account events to the consumer 16 at a display interface 20 of a computer device 22 (e.g., a smartphone, a tablet, a personal computer, etc.), and provide transaction control selections at the display interface 20 that allow the consumer 16 to invoke controls on the spending activities of accounts 14 stored with different resource provider computers 18.

As used herein, a resource provider computer 18 is a computer system associated with a resource provider 24 such as a merchant or mobile wallet provider. The resource provider computer 18 may host an e-commerce website or application, or a mobile wallet application. Examples of consumer accounts 14 include, but are not limited to, credit card accounts, debit card accounts, prepaid accounts, bank accounts, and other types of payment accounts. The account details that may be stored with the resource provider computers 18 may include, for example, an account number identifier (e.g., a personal account number (PAN)) and expiration date associated with the consumer's account 14.

As explained further below, the account-on-file tracking system 10 may include but are not limited to various entities or computer systems that communicate and share data over a communications network 26 such as the Internet (wide area network (WAN)) and Ethernet (local area network (LAN)). These entities may include the consumer's computer device 22, the portal 12, the resource provider computer(s) 18, an authorization computer 28, a processor server computer 30, a router computer 32, and a transaction control computer 34. The authorization computer 28 may be a computer system or server associated with an authority involved in authorizing transactions made with the consumer's account(s) 14. The authorization computer 28 may be associated with an issuer 36, such as a bank or financial institution that may have issued the account 14 to the consumer 16. The processor server computer 30 may be a computer system or server that processes transaction authorization requests involving the consumer's account(s) 14. An example of such a processing network includes VisaNet™ which processes credit card transactions, debit card transactions, and other types of account transactions.

The router computer 32 may be a computer system or server that routes transaction authorization requests and/or requests for token creation. As used herein, a "token" is a substitute identifier, such as a series of alphanumeric characters, which may be used as a substitute for an account identifier associated with the consumer's account 14. The transaction control computer 34 may be a computer system or server that implements requested controls over transactions made with the consumer's account 14. If a transaction request violates a control setting, the transaction control computer 34 will decline the transaction.

Figure 2:
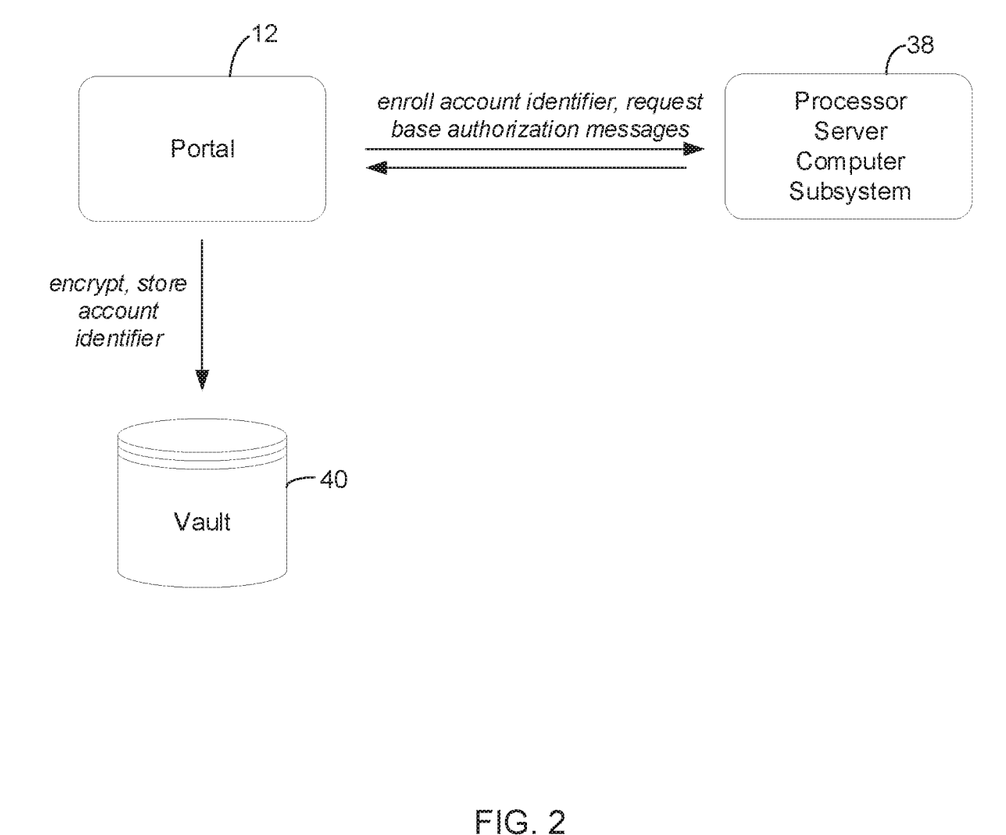
FIG. 2 is a schematic representation of enrolling a consumer's account in the account-on-file tracking system, according to one embodiment.

FIG. 2 depicts an exemplary enrollment process for enrolling the consumer's account 14 in the account-on-file tracking system 10. The consumer 16 may request enrollment of a selected account 14 by submitting a request to the issuer 36 or a card network in person, by mail or electronic mail, or at a website. The portal 12 may then connect to a sub-system of the processor server computer 38 to enroll the account identifier (e.g., PAN) associated with the account 14, and to subscribe to base authorization messages involving the account 14. As used herein, a "base authorization message" is an electronic message sent to an entity to perform an authorization process for a transaction involving the consumer's account 14. The base authorization messages may comply with ISO (International Organization of Standardization) 8583, which is a standard for systems that exchange electronic information related to transactions made using consumer accounts.

The portal 12 may also encrypt the account identifier and any other identifier obtained from the processor server computer subsystem 38, and store the encrypted identifier(s) in a secure vault 40. The enrollment process as depicted in FIG. 2 may be performed individually for each of the accounts 14 that the consumer 16 wants to track. The enrollment process may also involve establishing a user name and password for the consumer 16, allowing the consumer 16 to securely login and access the portal 12.

Figure 3:
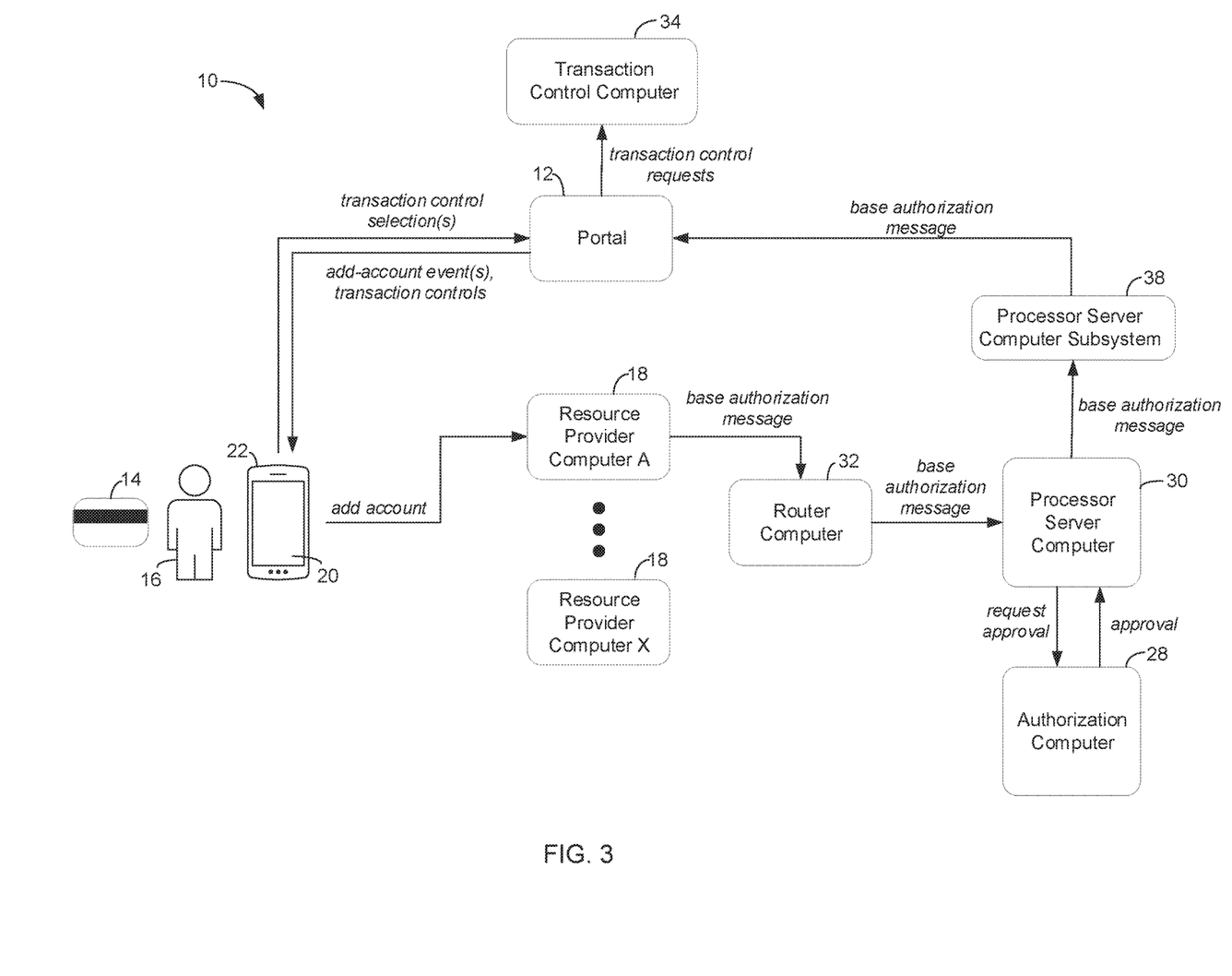
FIG. 3 is a schematic representation of the account-on-file tracking system applied to tracking accounts of the consumer stored with merchant e-commerce websites or applications, according to one embodiment.

FIG. 3 shows an application of the account-on-file tracking system 10 for tracking accounts 14 of the consumer 16 stored with one or more resource provider computers (A-X) 18 hosting merchant e-commerce websites or applications. The consumer 16 may add the account 14 to a selected resource provider computer (A) 18 by submitting account details associated with the account 14 to the resource provider computer 18. For example, the consumer 16 may add the account 14 to the resource provider computer 18 to purchase goods or services from a merchant, or to set up recurring purchases from the merchant. Once the account details have been added, the resource provider computer 18 may validate the account 14 by routing a base authorization message to the router computer 32 which may, in turn, route the base authorization message to the processor server computer 30. The base authorization message may be a transaction request to remove a predetermined amount of funds (e.g., $0 or $1) from the consumer's account 14 to validate the account 14. The transaction may be voided once the account 14 is validated. Upon receipt of the base authorization message, the processor server computer 30 may request transaction approval from the authorization computer 28. If the authorization computer 28 provides approval and the account 14 is validated, the processor server computer 30 may transmit the base authorization message to the processor server computer subsystem 38. The processor server computer subsystem 38 may check if the account 14 is enrolled in the account-on-file tracking system 10 and, if so, submit the base authorization message to the portal 12.

The portal 12 or the processor server computer subsystem 38 may designate the base authorization message as being associated with an add-account event based on an indicator carried by the base authorization message. In one embodiment, the base authorization message may carry a flag indicating that the transaction is an add-account event. In another embodiment, the indicator may be the transaction request to remove the pre-determined amount of funds (e.g., $0 or $1) from the consumer's account 14. That is, the portal 12 or the processor server computer subsystem 38 may designate the base authorization message as being associated with an add-account event based on the flag, or based on the authorization amount (e.g., $0 or $1) in the base authorization message. In addition, transaction details related to the add-account event may be embedded in the base authorization message. Such transaction details may include the merchant name, the merchant category code, the date and time of the add-account event, and the authorization amount in local or foreign currency.

The portal 12 may store the base authorization message and the transaction details pertaining to the add-account event in the vault 40 for display at the display interface 20 of the consumer's computer device 22 upon request (see further details below). Additionally, the portal 12 may provide the consumer 16 with transaction control selections at the display interface 20 that allow the consumer 16 to select desired transaction controls to place on the account 14 stored with the resource provider computer 18. Such transaction controls may specify a maximum amount of funds that may be used from the account 14 for transactions with the corresponding merchant over a predetermined time period (e.g., 100$/month, 50$/week, etc.). Other transaction controls may be requests to deactivate or withdraw the account 14 stored with the resource provider computer 18. The portal 12 may pass the consumer's transaction control requests to the transaction control computer 34 which declines transactions that violate the selected transaction controls.

Figure 4:
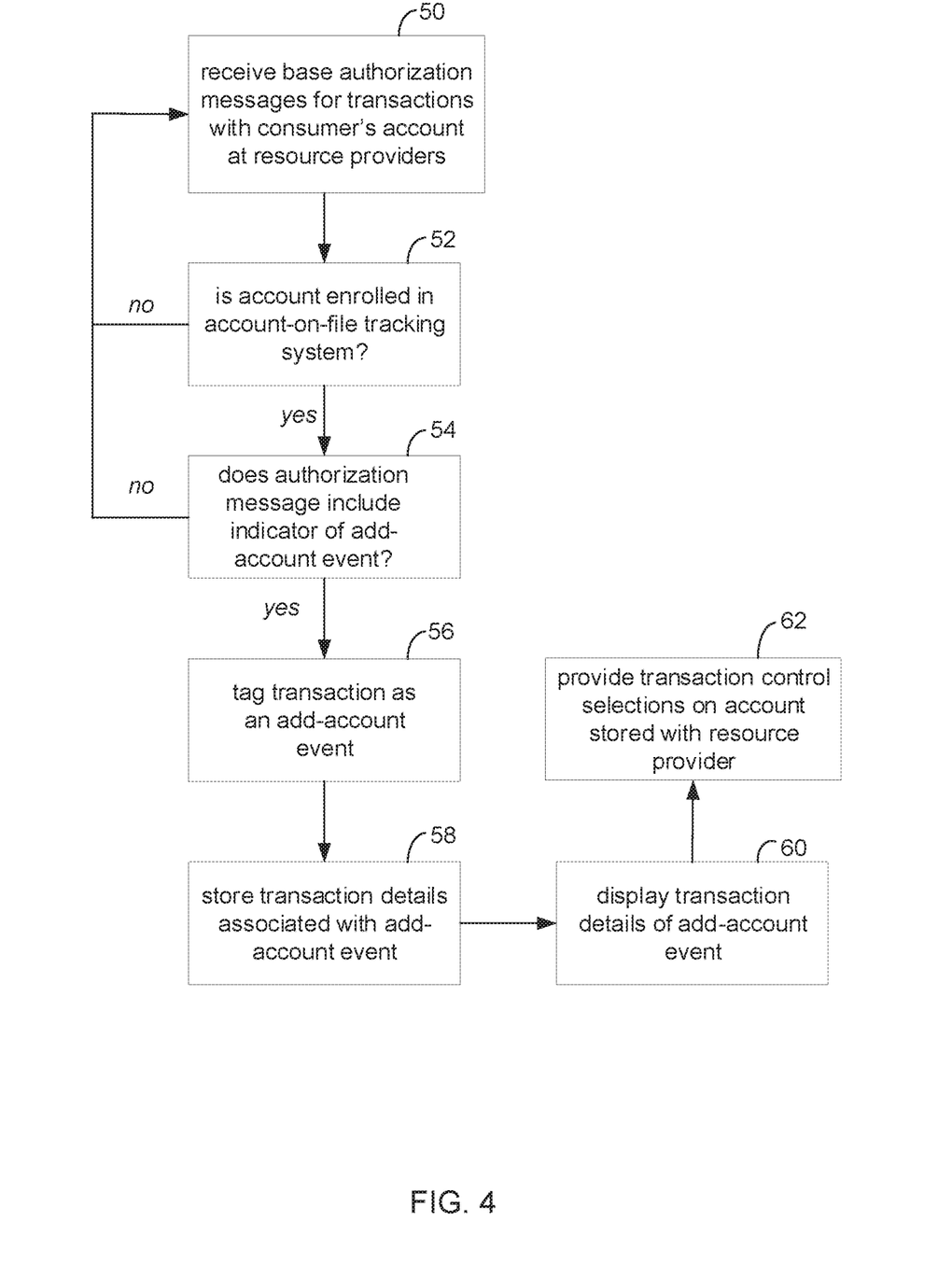
FIG. 4 is a flowchart illustrating a computer-implemented method for tracking the account of the consumer stored with merchant e-commerce websites or applications, according to one embodiment.

FIG. 4 depicts an exemplary method of applying the account-on-file tracking system 10 for tracking add-account events involving e-commerce websites and applications. The steps of the method of FIG. 4 may be performed by the portal 12 and/or the processor server computer subsystem 38. At a first block 50, a plurality of base authorization messages for transactions with the consumer's account 14 with one or more resource providers 18 may be received. If the account is enrolled in the account-on-file tracking system 10 as determined at the block 52, the base authorization messages carrying an indicator that the associated transaction is an add-account event may be selected and tagged as an add-account event according to blocks 54 and 56. The transaction details associated with each of the add-account events may be stored in the portal 12 according to a next block 58. Upon request by the consumer 14, the transaction details of the add-account events (merchant name, date/time of add-account event, etc.) may be displayed to the consumer 16 at the display interface 20 (block 60), along with transaction controls for selection by the consumer 16 (block 62). It is noted that the method of FIG. 4 is exemplary, and the steps may be performed in different orders or simultaneously in practice.

The above method may apply to each of the resource provider computers (A-X) 18 with which the consumer 16 stores his or her account details. In addition, the above method is applicable to multiple accounts 14 held by the consumer 16 that are enrolled in the account-on-file tracking system 10. As such, the portal 12 may display the transaction details associated with add-account events for multiple accounts stored with multiple resource providers 18 on an on-demand basis. More specifically, the consumer 16 may access the portal 12 from the computer device 22 and select a desired account to track, and the portal 12 may display transaction details associated with every add-card event linked with the selected account (see further details below).

Figure 5:
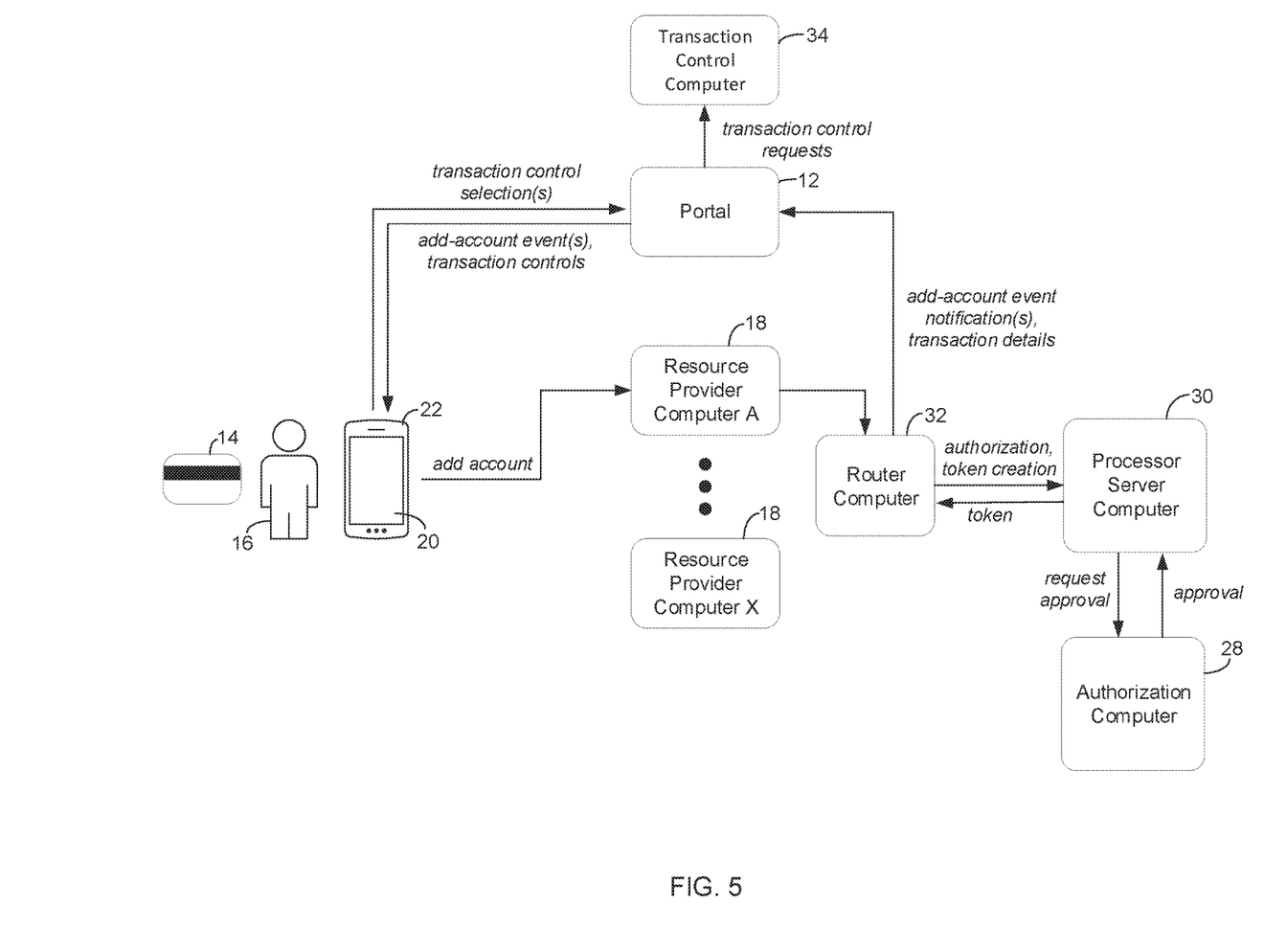
FIG. 5 is a schematic representation of the account-on-file tracking system applied to tracking accounts of the consumer stored with mobile wallet provider applications, according to one embodiment.

FIG. 5 shows an application of the account-on-file tracking system 10 for tracking accounts 14 of the consumer 16 stored with one or more resource provider computers (A-X) 18 hosting mobile wallet applications. The consumer may add the account 14 to a selected resource provider computer (A) 28 by submitting account details associated with the account 14 to the resource provider computer 18. In response, the resource provider computer (A) 18 may submit a request to the router computer 32 to initiate account validation and token creation, and the router computer 32 may respond by sending an authorization request and token creation request to the processor server computer 30. Upon receipt of the request, the processor server computer 30 may request approval from the authorization computer 28 for adding the account 14 to the resource provider computer 18. If approval is received from the authorization computer 28, the processor server computer 30 may generate a token for the account 14 and send the token to the router computer 14. Upon receipt of the token indicating successful account validation, the router computer 32 may transmit a notification of the add-card event as well as the transaction details associated with the add-account event to the portal 12. The transaction details may include, for example, the mobile wallet provider name, the date and time of the add-account event, token request identification, token digits, and token status.

If the account 14 is enrolled in the account-on-file tracking system 10, the portal 12 may store the transaction details of the add-account event and display the transaction details to the consumer 16 at the display interface 20 upon request. The portal 12 may also provide transaction control selections at the display interface 20 that allow the consumer 16 to select desired transaction controls (e.g., spending limits, account withdrawal from the mobile wallet provider, etc.) to place on the account 14 stored with the resource provider computer 18. The portal 12 may transmit the consumer's transaction control requests to the transaction control computer 34 for implementation of the controls as described above.

Figure 6:
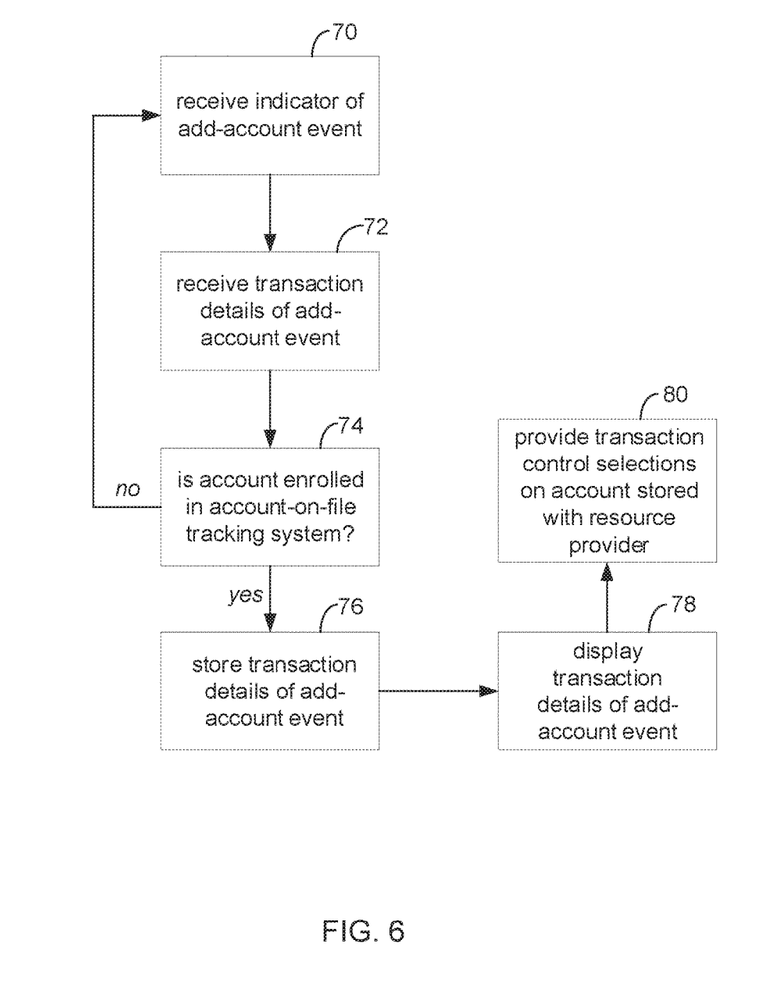
FIG. 6 is a flowchart illustrating a computer-implemented method for tracking the accounts of the consumer stored with merchant e-commerce websites and applications, and mobile wallet applications, according to one embodiment.

FIG. 6 shows an exemplary method for tracking add-account events involving merchant e-commerce websites, e-commerce applications, or mobile wallet provider applications. In some embodiments, the method may be performed by the portal 12 and/or the processor server computer subsystem 38. Beginning at a first block 70, an indicator that the consumer stored account details of the account 14 with a resource provider computer 18 (of a merchant or a mobile wallet provider) in an add-account event may be received. If the resource provider computer 18 hosts an e-commerce website or application, the indicator may be a flag in the base authorization message or an authorization amount (e.g., $0 or $1) in the base authorization message as described above. If the resource provider computer 18 hosts a mobile wallet application, the indicator may be a notification from the router computer 32 that an add-account event has occurred (see FIG. 5). According to a next block 72, transaction details associated with the add-account event may be received. The transaction details may be embedded in the base authorization message (if the resource provider computer 18 hosts an e-commerce website or application), or the transaction details may be transmitted from the router computer 32 (if the resource provider computer 18 hosts a mobile wallet application).

If the account is enrolled in the account-on-file tracking system 20 as determined at a block 74, the transaction details associated with the add-account event may be stored in the portal 12 (block 76) and displayed to the consumer at the display interface 20 upon request (block 78). Transaction control selections for the account 14 stored with the resource provider computer 18 may also be presented to the consumer 16 at the display interface 20 according to a block 80. The order of the steps in FIG. 6 is exemplary and may be performed in different orders or simultaneously in practice. Additionally, the method may be performed for each of the resource provider computers 18 with which the consumer 16 stores his or her account details, and may be applicable to multiple accounts held by the consumer.

Figure 7:
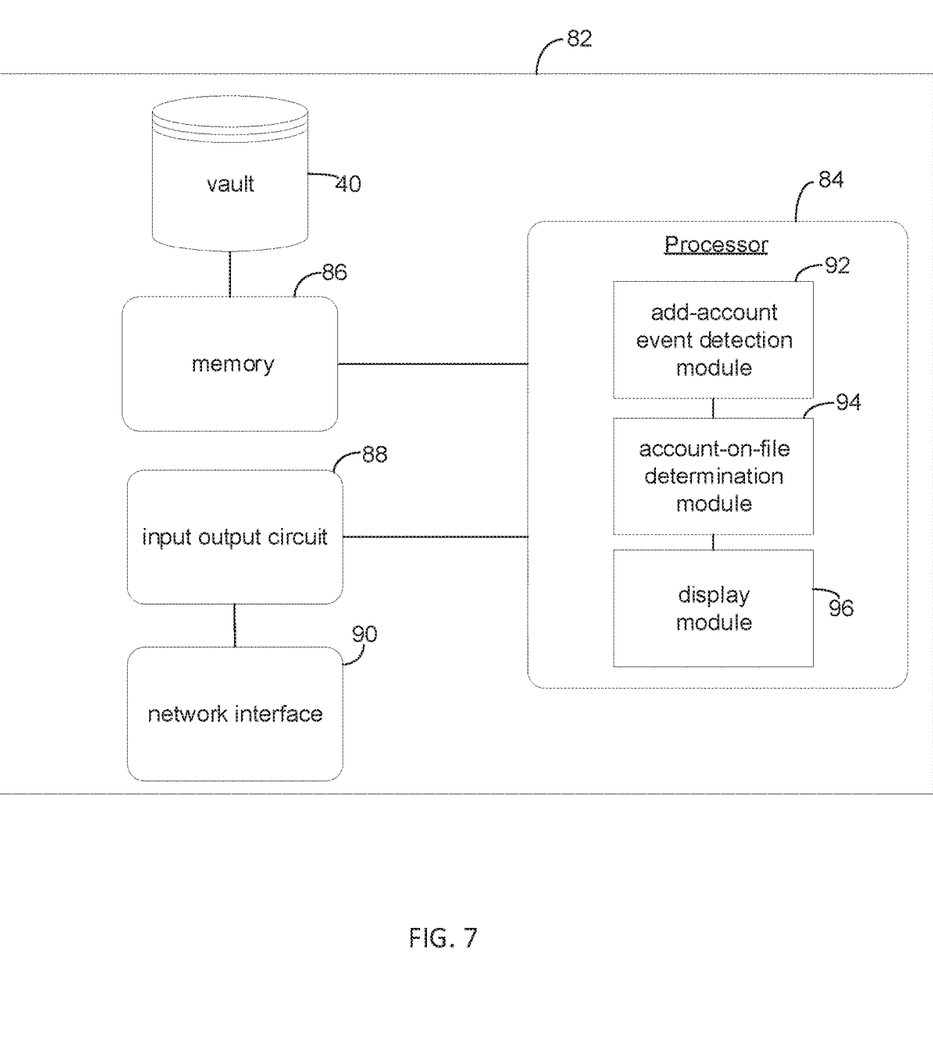
FIG. 7 is a schematic representation of a computer device configured to perform at least some of the functions of the account-on-file tracking system, according to one embodiment.

Turning to FIG. 7, an exemplary computer device 82 configured to perform at least some of the functions of the account-on-file tracking system 10 is shown. In one embodiment, the computer device 82 may be representative of a computer device used to operate the portal 12. The computer device 82 may include one or more processors 84 configured according to computer-executable instructions for carrying out at least some of the functions of the portal 12. The computer device 82 may further include a memory 86 configured to store computer executable instructions and assist the processor 84. The vault 40 may be associated with the memory 86 for storing encrypted account identifiers upon enrollment of the consumer's account in the account-on-file tracking system 10, and for storing transaction details associated with add-account events. An input output circuit 88 may be in communication with the processor 84, and may be involved in receiving inputs (e.g., base authorization messages, transaction details, notifications of add-account events, etc.), and providing outputs (e.g., add-account event transaction details, transaction control selections, etc.). The computer device 82 may further include a network interface 90 to enable communication with other entities of the account-on-file tracking system 10 over the communication network 26.

The processor 84 may include one or more modules configured to perform computer-executable instructions associated with the account-on-file tracking system 10. An add-account event detection module 92 may be configured to detect add-account events associated with one or more of the consumer's accounts 14, and an account-on-file determination module 94 may be configured to determine whether the accounts 14 are enrolled in the account-on-file tracking system 10 based on the account identifiers stored during the enrollment process (see FIG. 2). A display module 96 may be configured to display transaction details associated with add-account events to the consumer 16 at the display interface 20, and to display the transaction control selections to the consumer 16 at the display interface 20. The modules 92, 94, and 96 may be associated with the portal 12 and/or the processor server computer subsystem 38. In some embodiments, the processor server computer subsystem 38 may perform some of the above-described functions of the modules, such as detecting the add-account events and/or determining whether the account is enrolled in the account-on-file tracking system 10. In other embodiments, the portal 12 may perform all of the above-described functions of the modules. Furthermore, in some embodiments, the above-described functions may be performed by a single module, or may be distributed over different modules and/or processing systems.

Figure 8:
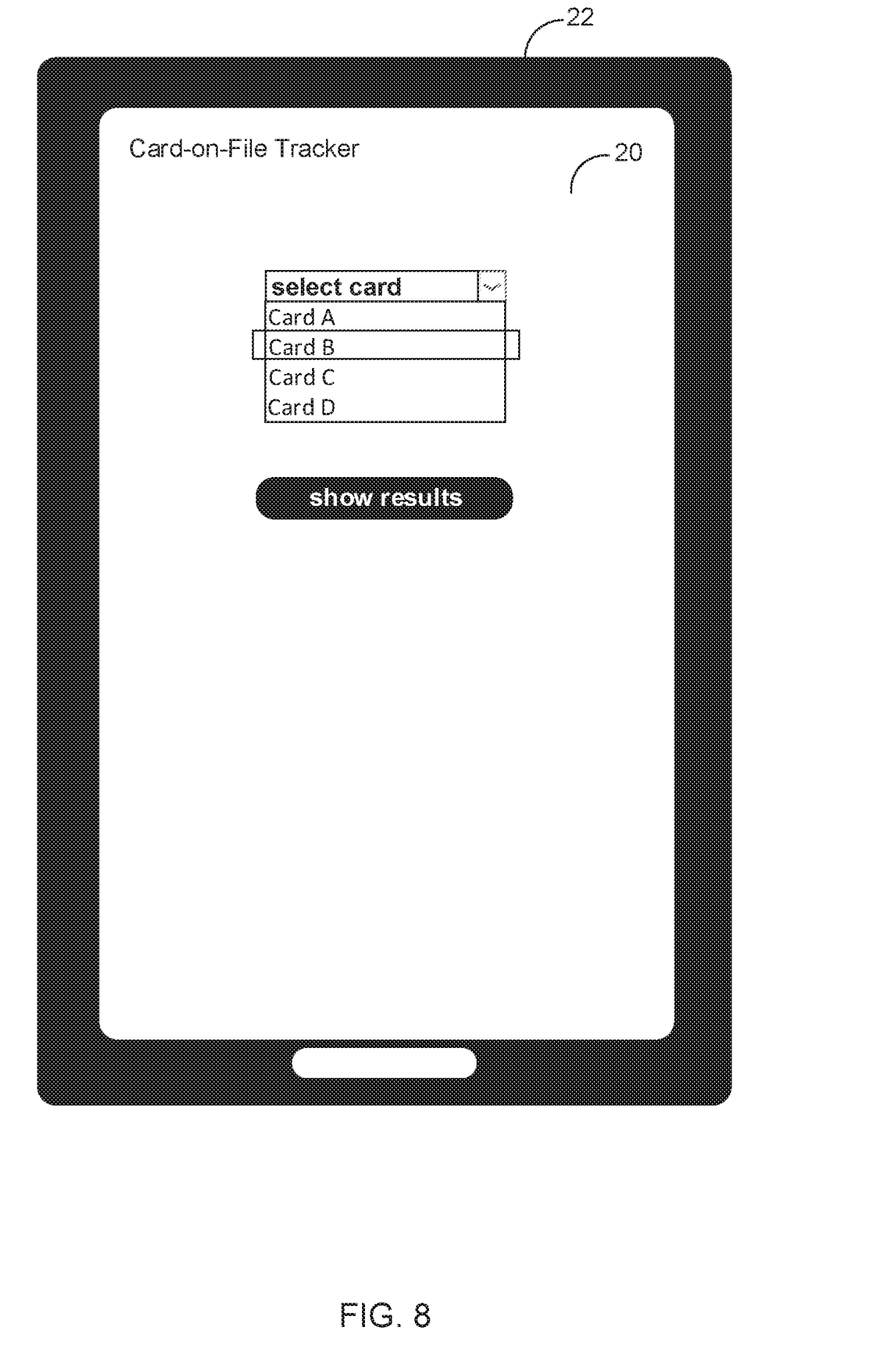
FIG. 8 is an exemplary display interface of the account-on-file tracking system as viewed at a computer device of the consumer, according to one embodiment.
Figure 9:
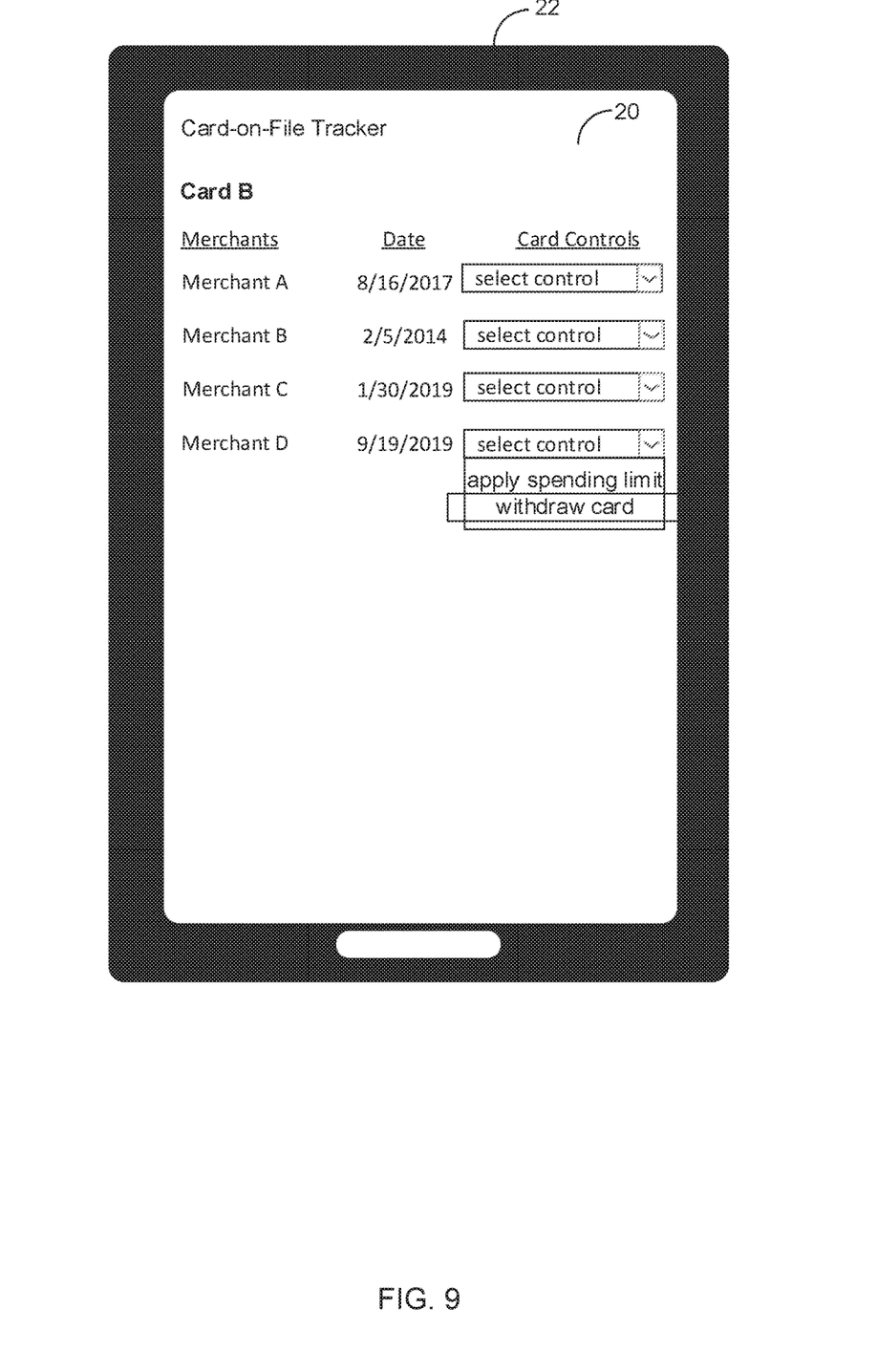
FIG. 9 is another exemplary display interface of the account-on-file tracking system as viewed at the consumer's computer device, according to one embodiment.

FIGS. 8-9 are exemplary display interfaces 20 as viewed from the consumer's computer device 22 when participating in the account-on-file tracking system 10. After logging into the portal 12, the consumer 16 may select an account 14 (e.g., card A, card B, card C, card D, etc.) that he or she would like to track from the display interface 20 (see FIG. 8). The portal 12 may only allow the consumer 16 to select from accounts that have been enrolled in the account-on-file tracking system 10. Upon selection of the desired account, the portal 12 may display each of the merchants and/or mobile wallet providers with which the consumer 16 has stored details associated with the selected account (see FIG. 9). Details of each of the add-account events, such as the merchant/mobile wallet provider name and date of the add-account event, may be displayed to the consumer 16 at the display interface 20. The consumer 16 may also select transaction controls to regulate spending with the account stored with each of the merchants and/or mobile wallet providers (see FIG. 9). For example, the display interface 20 may provide a drop-down menu to allow selection of transaction controls such as "apply spending limit" or "withdraw card". If the consumer selects "apply spending limit", an element may appear allowing the consumer 16 to set the specific spending limits he or she would like to apply (e.g., $100/month, etc.).

It is noted here that the display interfaces 20 of FIGS. 8-9 are merely exemplary, and may include more or less features, or may have a different appearance in practice. For example, in some implementations of the account-on-file tracking system 10, the portal 12 may display transaction details associated with each of the transactions (after the initial add-account event) involving the consumer's account 14 and the merchant and/or mobile wallet provider, allowing the consumer 16 to follow his or her spending with the stored account.

The account-on-file tracking system of the present disclosure provides a solution to consumers' need for tracking which merchants and/or mobile wallet providers are holding their account details on file. The portal allows consumers to monitor where their accounts are stored, and to invoke transaction controls on each of the stored accounts from a single platform. The result is a technological solution that requires less processor cycles and decreased communication bandwidth usage as the central tracking location eliminates much of the repeated query based approach of the past.

What is claimed is:

1. A computer-implemented method, comprising:
receiving a request from a consumer to enroll an account in an account-on-file tracking system that tracks add-account events for the account, wherein an add-account event occurs when details of the account are stored with a resource provider computer;
receiving an account identifier associated with the account;
encrypting the account identifier and storing the encrypted account identifier in a secure vault;
receiving a base authorization message for a transaction from a first resource provider computer of a first merchant;
determining if the base authorization message includes an indicator of an add-account event;
in response to a determination that the base authorization message includes the indicator of an add-account event, tagging the transaction as an add-account event;
in response to tagging the transaction as an add-account event, receiving transaction details associated with the add-account event, the transaction details at least including a date of the add-account event, an authorization amount, and a name of the first merchant, the transaction details being embedded in the base authorization message;

determining whether the add-account event is for the account that is enrolled in the account-on-file tracking system;

in response to a determination that the account is enrolled in the account-on-file tracking system, displaying the transaction details associated with the add-account event to the consumer at a display interface of a computer device;

displaying at the display interface of the computer device one or more transaction control selections in a first drop down menu to permit the consumer to place one or more transaction controls on the account that is stored with the first resource provider computer;

determining if the first resource provider computer is hosting an e-commerce website or application;

in response to a determination that the first resource provider computer hosts the e-commerce website or application, removing a pre-determined amount of funds from the account according to the one or more transaction controls selected by the consumer using the drop down menu for the account, wherein the pre-determined amount is less than or equal to the authorization amount;

displaying all the merchants for which the account is enrolled in the account-on-file tracking system;

receiving a selection to withdraw the account from a second resource provider computer for a second merchant via a second drop down menu; and withdrawing the account from the second resource provider computer for the second merchant.

2. A system for tracking one or more accounts of a consumer that are stored with one or more resource provider computers comprising:

a memory storing computer executable instructions;

a processor in communication with the memory that performs computer executable instructions to:

receive a request from the consumer to enroll an account in an account-on-file tracking system that tracks add-account events for the account, wherein an add-account event occurs when details of the account are stored with a resource provider computer;

receive an account identifier associated with the account;

encrypt the account identifier and storing the encrypted account identifier in a secure vault;

receive a base authorization message for a transaction from a first resource provider computer of a first merchant;

determine if the base authorization message includes an indicator of an add-account event;

in response to a determination that the base authorization message includes the indicator of an add-account event, tag the transaction as an add-account event;

in response to tagging the transaction as an add-account event, receive transaction details associated with the add-account event, the transaction details at least including a date of the add-account event, an authorization amount, and a name of the first merchant, the transaction details being embedded in the base authorization message;

determine whether the add-account event is for the account that is enrolled in the account-on-file tracking system;

in response to a determination that the account is enrolled in the account-on-file tracking system, display the transaction details associated with the add-account event to the consumer at a display interface of a computer device;

display at the display interface of the computer device one or more transaction control selections in a first drop down menu that permit the consumer to place one or more transaction controls on the account that is stored with the first resource provider computer;

determine if the first resource provider computer is hosting an e-commerce website or application;

in response to a determination that the first resource provider computer hosts the e-commerce website or application, remove a pre-determined amount of funds from the account according to the one or more transaction controls selected by the consumer using the drop down menu for the account, wherein the pre-determined amount is less than or equal to the authorization amount;

display all the resource providers and associated merchants for which the account is enrolled in the account-on-file tracking system;

receive a selection to withdraw the account from a second resource provider computer for a second merchant via a second drop down menu; and withdraw the account from the second resource provider computer for the second merchant.

3. A non-transitory processor-readable tangible medium storing processor-issuable authentication instructions to:

receive a request from a consumer to enroll an account in an account-on-file tracking system that tracks add-account events for the account, wherein an add-account event occurs when details of the account are stored with a resource provider computer;

receive an account identifier associated with the account;

encrypt the account identifier and storing the encrypted account identifier in a secure vault;

receive a base authorization message for a transaction from a first resource provider computer of a first merchant;

determine if the base authorization message includes an indicator of an add-account event;

in response to a determination that the base authorization message includes the indicator of an add-account event, tag the transaction as an add-account event;

in response to tagging the transaction as an add-account event, receive transaction details associated with the add-account event, the transaction details at least including a date of the add-account event, an authorization amount, and a name of the first merchant, the transaction details being embedded in the base authorization message;

determine whether the add-account event is for the account that is enrolled in the account-on-file tracking system;

in response to a determination that the account is enrolled in the account-on-file tracking system, display the transaction details associated with the add-account event to the consumer at a display interface of a computer device;

display at the display interface of the computer device one or more transaction control selections in a first drop down menu that permit the consumer to place one or more transaction controls on the account that is stored with the first resource provider computer;

determine if the first resource provider computer is hosting an e-commerce website or application;

in response to a determination that the first resource provider computer hosts the e-commerce website or application, remove a pre-determined amount of funds from the account according to the one or more transaction controls selected by the consumer using the drop down menu for the account, wherein the pre-determined amount is less than or equal to the authorization amount;

display all the resource providers and associated merchants for which the account is enrolled in the account-on-file tracking system;

receive a selection to withdraw the account from a second resource provider computer for a second merchant via a second drop down menu; and withdraw the account from the second resource provider computer for the second merchant.

4. The computer-implemented method of claim 1, further comprising:

providing a portal where the consumer can enroll the account into the account-on-file tracking system; and connecting, via the portal, to a processor server computer to enroll the account identifier associated with the account into the account-on-file tracking system and to subscribe to base authorization messages involving the account, wherein the portal encrypts the account identifier received from the processor server computer.

5. The computer-implemented method of claim 1, wherein enrolling an account into the account-on-file system for a selected resource provider computer of a merchant, further comprises:

submitting details of the account to the selected resource provider computer;

validating the account by sending a first base authorization message to a processor server computer, wherein the first base authorization is a transaction request to remove a predetermined amount of funds from the account; and voiding the transaction once the account is validated and enrolled.

* * * * *